US009858547B2

(12) United States Patent
Jones et al.

(10) Patent No.: US 9,858,547 B2
(45) Date of Patent: Jan. 2, 2018

(54) OVERSTOCK INVENTORY MANAGEMENT AT RETAIL SALES FACILITIES

(71) Applicant: Wal-Mart Stores, Inc., Bentonville, AR (US)

(72) Inventors: Matthew A. Jones, Bentonville, AR (US); Nicholaus A. Jones, Fayetteville, AR (US); Robert J. Taylor, Rogers, AR (US); Marc A. Fletter, Bentonville, AR (US); Daniel R. Shields, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/203,482

(22) Filed: Jul. 6, 2016

(65) Prior Publication Data

US 2017/0039514 A1 Feb. 9, 2017

Related U.S. Application Data

(60) Provisional application No. 62/201,034, filed on Aug. 4, 2015.

(51) Int. Cl.
*G06Q 90/00* (2006.01)
*G06Q 10/08* (2012.01)
(Continued)

(52) U.S. Cl.
CPC ....... *G06Q 10/087* (2013.01); *G06K 7/10009* (2013.01); *G06K 19/06028* (2013.01)

(58) Field of Classification Search
CPC ..... G06Q 10/087; G06Q 20/203; G06Q 10/08
(Continued)

(56) References Cited

U.S. PATENT DOCUMENTS 7,797,205 B2 * 9/2010 Song ............... G06Q 10/04
705/28
8,386,342 B2 2/2013 Ferreri
(Continued)

FOREIGN PATENT DOCUMENTS

EP 1265174 A1 12/2002
JP 2002000247 A 1/2002

OTHER PUBLICATIONS

Ileana Pinto, "Developing a framework of inventory management practices for the logistics centralization plan of five departments in UMC St. Radboud" Aug. 26, 2011, University of Twente, The Netherlands (45 pgs.).
(Continued)

*Primary Examiner* — Jamara Franklin
(74) *Attorney, Agent, or Firm* — Fitch, Even, Tabin & Flannery LLP

(57) ABSTRACT

In some embodiments, methods and systems of sorting products at a retail sales facility include receiving identifying information associated with a product at the retail sales facility using an inventory management electronic device, obtaining a demand for the product from a time products identical to the product were delivered to the retail sales facility, calculating whether the demand for the product supports moving the product onto a sales floor of the retail sales facility or storing the product in a stock room of the retail sales facility, determining a characteristic for the product, and outputting, when the demand supports storing the product in the stock room, an indication to a worker at the retail sales facility that the product is to be stored in the stock room at a location selected based on the determined characteristic for the product.

21 Claims, 4 Drawing Sheets

(51) Int. Cl.
*G06K 19/06* (2006.01)
*G06K 7/10* (2006.01)

(58) Field of Classification Search
USPC .................................... 235/385; 705/22, 28
See application file for complete search history.

(56) References Cited

U.S. PATENT DOCUMENTS

| 8,515,835 B2 | 8/2013 | Wu |
| 2007/0288296 A1 | 12/2007 | Lewis |
| 2013/0173435 A1 | 7/2013 | Cozad |

OTHER PUBLICATIONS

"Warehousing and Inventory Management" Logistics Operational Guide, website: http://log.logcluster.org/response/warehousemanagement/; Apr. 10, 2015; pp. 1-14.

* cited by examiner

OVERSTOCK INVENTORY MANAGEMENT AT RETAIL SALES FACILITIES

CROSS-REFERENCE TO RELATED APPLICATION

This application claims the benefit of U.S. Provisional Application No. 62/201,034, filed Aug. 4, 2015, and is incorporated herein by reference in its entirety.

TECHNICAL FIELD

This invention relates generally to managing inventory at retail sales facilities and, in particular, to systems and methods for sorting overstock items at retail sales facilities.

BACKGROUND

Retail sales facilities often employ inventory management associates that perform different tasks related to inventory management and stocking. One associate may unload items from a delivery truck and place the unloaded items into a receiving area for sorting. Another associate may be responsible for bringing the items to the sales floor and stocking the items on shelves on the sales floor. Yet another associate may be responsible for taking the "overstock" items to the stock room and storing the items in storage bins in the stock room. Still another associate may be responsible for retrieving the "overstock" items from the stock room and delivering the items from the stock room to the shelves on the sales floor. Generally, each associate scans the item and enters information regarding the location of the item into the system.

Since errors in inventory management systems generally result from user input errors, the use of multiple inventory management associates that independently perform separate stocking tasks, item scans, and inventory management system data entry is subject to an increased likelihood of user error and the resulting decreased inventory management efficiency at the retail sales locations. As such, the wrong item may be inadvertently scanned, or information regarding the wrong item may be entered into the inventory management database due to user error, leading to undesired situations where the items stored in the stock room are systematically misplaced, which in turn leads to inefficiency in retrieving such items, since inventory management associates are forced to search for the misplaced items in the stock room or elsewhere at the retail sales facility.

BRIEF DESCRIPTION OF THE DRAWINGS

Disclosed herein are embodiments of systems, apparatuses and methods pertaining to methods and systems for sorting overstock inventory. This description includes drawings, wherein.

Figure 1:
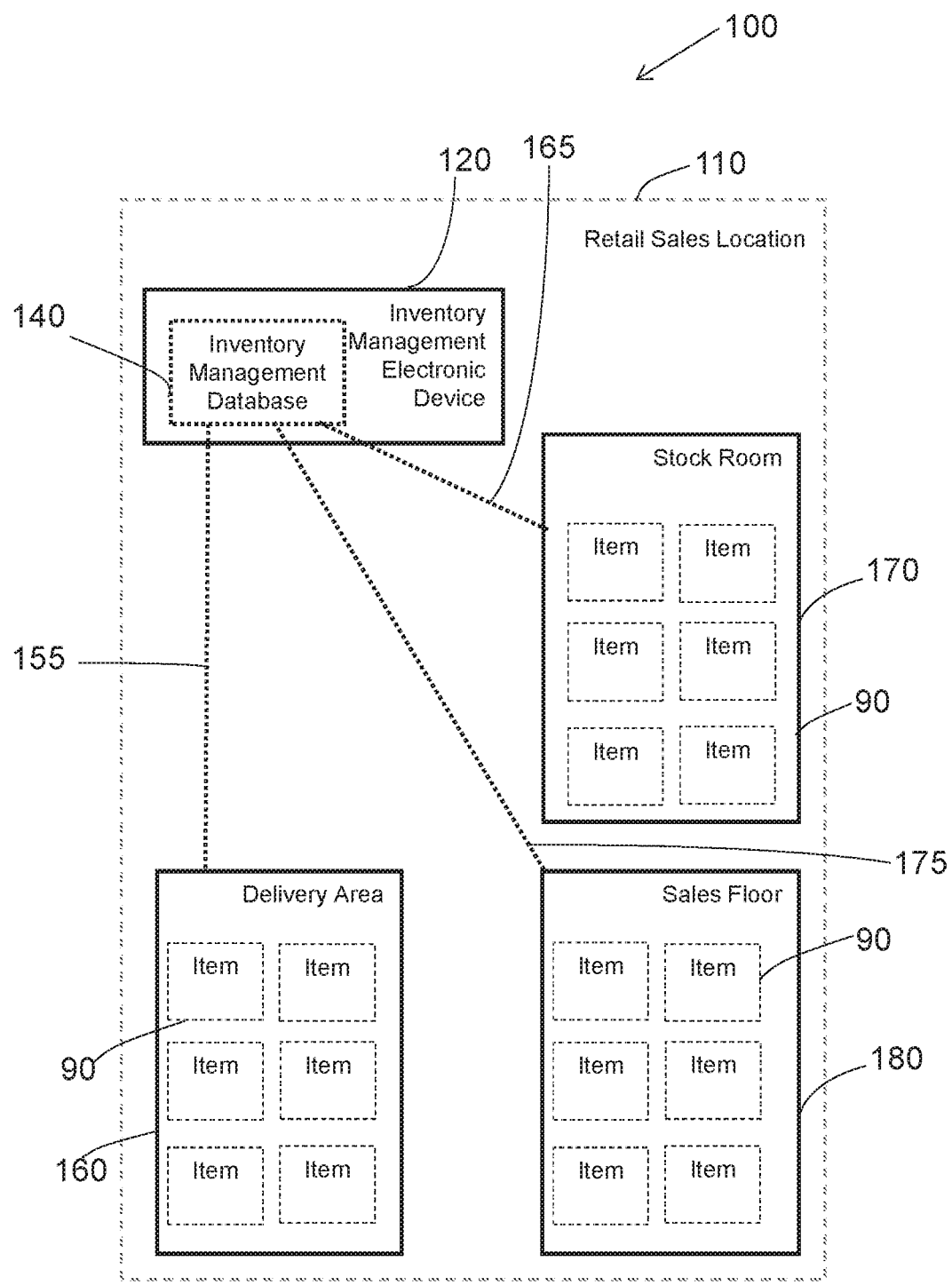
FIG. 1 is a diagram of a retail sales facility overstock sorting system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, this application describes systems and methods for managing product inventory at retail sales facilities. In some embodiments, the systems and methods as described herein include one or more electronic devices configured to determine whether an item that is located in a product unloading area, or any other location at the retail sales facility where products may be located prior to being placed into storage bins in the stock room or onto shelves on the sales floor, is to be placed on a shelf on the sales floor, or into a storage bin or another location in a stock room, and then determine a characteristic of a product to be stored in the stock room and store the item in the stock room area of the retail sales facility based on the determined characteristic of the product such that items having identical or like characteristics are stored together at the retail sales facility for easy retrieval of the items from the stock room or another storage location at the retail sales facility.

A method of sorting products at a retail sales facility according to one embodiment includes: receiving identifying information associated with at least one product at the retail sales facility using an inventory management electronic device including a processor; obtaining, using the inventory management electronic device, a demand for the at least one product from a time products identical to the at least one product were delivered to the retail sales facility; calculating, using the inventory management electronic device, whether the demand for the at least one product supports moving the at least one product onto a sales floor of the retail sales facility or storing the at least one product in a stock room of the retail sales facility; determining, using the inventory management electronic device, a characteristic for the at least one product; and outputting, using the inventory management electronic device, when the demand supports storing the at least one product in the stock room, an indication to a worker at the retail sales facility that the at least one product is to be stored in the stock room at a location selected based on the determined characteristic for the at least one product.

A system for sorting products at a retail sales facility according to one embodiment includes: a database including identifying information associated with at least one product at the retail sales facility; and an electronic device including a control circuit having a processor in communication with the database and configured to: receive the identifying information associated with at least one product at the retail sales facility; obtain a demand for the at least one product from a time products identical to the at least one product were delivered to the retail sales facility; calculate whether the demand for the at least one product supports moving the at least one product onto a sales floor of the retail sales facility or storing the at least one product in a stock room of the retail sales facility; determine a characteristic for the at least one product; and output, when the demand supports storing the at least one product in the stock room, an indication to a worker at the retail sales facility that the at least one product is to be stored in the stock room at a location selected based on the determined characteristic for the at least one product.

A system for sorting products at a retail sales facility according to one embodiment includes: a storage means including identifying information associated with at least one product at the retail sales facility and a control means in communication with the database and configured to: receive the identifying information associated with at least one product at the retail sales facility; obtain a demand for the at least one product from a time products identical to the at least one product were delivered to the retail sales facility; calculate whether the demand for the at least one product supports moving the at least one product onto a sales floor of the retail sales facility or storing the at least one product in a stock room of the retail sales facility; determine a characteristic for the at least one product; and output, when the demand supports storing the at least one product in the stock room, an indication to a worker at the retail sales facility that the at least one product is to be stored in the stock room at a location selected based on the determined characteristic for the at least one product.

Referring to FIG. 1, one embodiment of a system 100 for sorting inventory of consumer products at a retail sales facility 110 is shown. The retail sales facility 110 may be any place of business such as a store or warehouse where consumer products are stocked and/or sold. The system 100 includes an electronic device 120 configured to manage product inventory at the retail sales facility 110. The inventory management electronic device 120 illustrated in FIG. 1 may be a stationary, portable, or hand-held electronic device, for example, a desktop computer, a laptop computer, a tablet, a mobile phone, or any other device that may be configured for entry of data relating to inventory management. The inventory management electronic device 120 may be configured for communication with another device located at the retail sales facility 110, or at a location remote to the retail sales facility 110 (e.g., a regional server or central server configured for two-way communication with multiple retail sales facilities 110).

The inventory management electronic device 120 shown in FIG. 1 includes an inventory management database 140 configured to store information regarding the items or products 90 stored and/or offered for sale at the retail sales facility 110. The inventory management database 140 may be stored, for example, on non-volatile storage media (e.g., a hard drive, flash drive, or removable optical disk) internal or external relative to the inventory management electronic device 120 or internal to computing devices (e.g., remote server) separate and distinct from the inventory management electronic device 120. The information regarding the products 90 may be, for example, the number of products 90 on-hand (e.g., in the delivery area 160, stock room 170 or on the sales floor 180) at the retail sales facility 110, the number of products 90 sold since last delivery of the products 90 to the retail sales facility 110, or the number of products 90 sold within any other period of time (e.g., day, week, month, year) at the retail sales facility 110.

FIG. 1 schematically shows (via dotted lines 155, 165, and 175) that the inventory management database 140 receives and contains information regarding items 90 present in the delivery area 160, stock room 170, and sales floor 180 of the retail sales facility 110. The items 90 may be identified in the inventory management database 140 by way of stock keeping unit (SKU) numbers or any other unique identifiers. It will be appreciated that the inventory management database 140 does not have to be incorporated into the inventory management electronic device 120 local to the retail sales facility 110, but may be stored on a remote server in communication with the inventory management electronic device 120.

Figure 2:
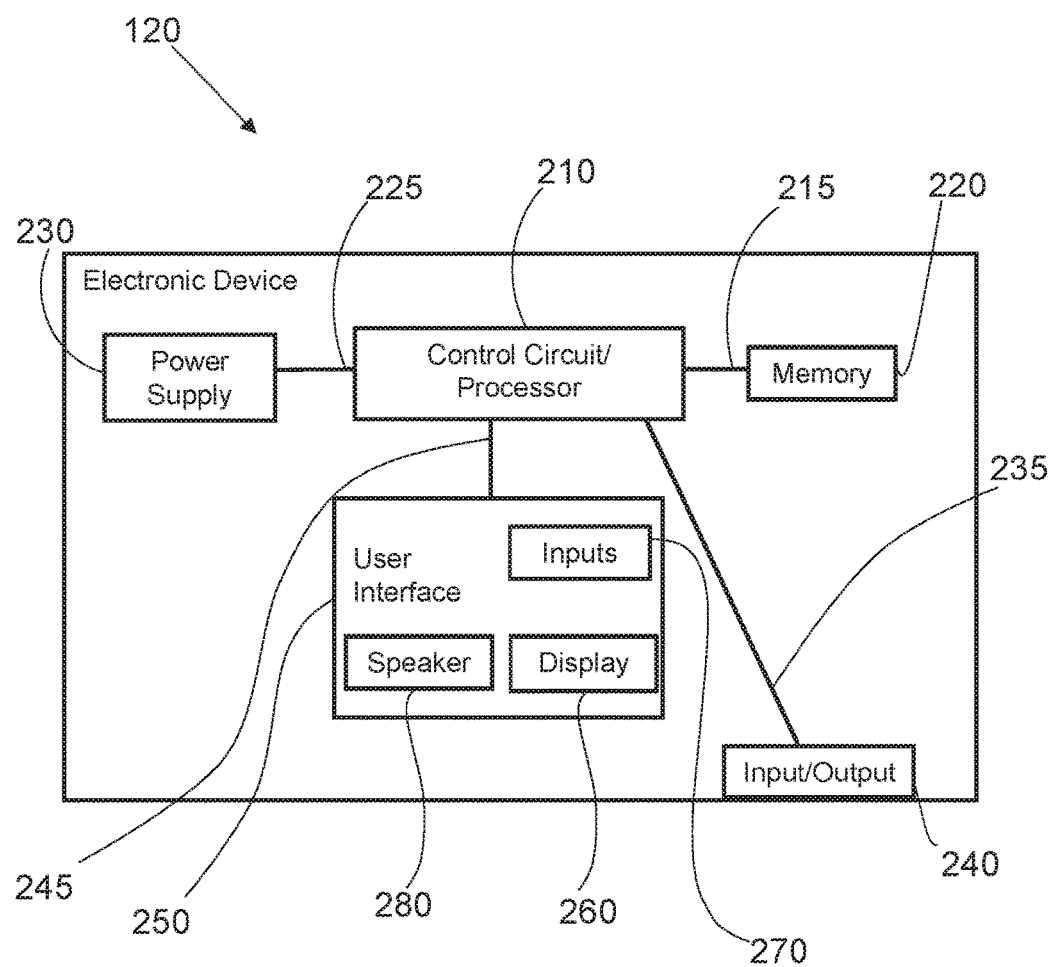
FIG. 2 is a functional diagram of an inventory management electronic device in accordance with several embodiments.

An exemplary inventory management electronic device 120 depicted in FIG. 2 is a computer-based device and includes a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)).) The control circuit 210 of the inventory management electronic device 120 is also electrically coupled via a connection 235 to an input/output 240 that can receive signals from and send signals (via a wired or wireless connection) to (e.g., commands, inventory database information), for example, devices local to the retail sales facility 110, or one or more servers remote to the retail sales facility 110.

In the embodiment shown in FIG. 2, the control circuit 210 of the inventory management electronic device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the inventory management electronic device 120 by inputting commands, for example, via touch-screen and/or button operation or voice commands. The display screen 260 can also permit the user to see various menus, options, and/or alerts displayed by the inventory management electronic device 120. The user interface 250 of the inventory management electronic device 120 may also include a speaker 280 that may provide audible feedback (e.g., alerts) to the user.

As can be seen in FIG. 1, the inventory management electronic device 120 may obtain identifying information regarding a product 90 located at the product unloading area 160 of the retail sales facility 110. It will be appreciated that the inventory management electronic device 120 may likewise obtain identifying information regarding the products 90 located anywhere else at the retail sales facility 110, such as in a stock room 170, on the sales floor 180 of the retail sales facility 110, or any other location where "overstock" products (e.g., overstock from the sales floor, product returns, or new shipments received from deliveries) may be temporarily stored prior to being sorted for placement into storage bins in the stock room 170.

The information identifying the product 90 may be acquired (as indicated by the dotted line 155) by the inventory management electronic device 120 when a stocking associate either scans the product 90 (e.g., scans the barcode or a radio frequency identification (RFID)), or enters an SKU number identifying the product 90, at the unloading area 160 of the retail sales facility 110. In some embodiments, the information identifying the product 90 may be entered into the inventory management system 100 without requiring the stocking associate to manually scan the product 90 or manually enter the SKU number identifying the product 90. Examples of such inventory management electronic devices 120 may include, but are not limited to an RFID portal, an Accu-Sort®-type fixed position scanner (laser or CCD-based), a visual recognition scanner, or the like, which may be coupled to a visual display (e.g., wall-mounted or overhead projector) for displaying identifying and/or stocking information for the product 90 to the stocking associate at the unloading area 160 (or another location) of the retail sales facility 110. The acquired information identifying the product 90 may be stored in the inventory management database 140 of the inventory management electronic device 120 and/or may be communicated by the inventory management electronic device 120 to a remote database on a remote server.

Figure 3:
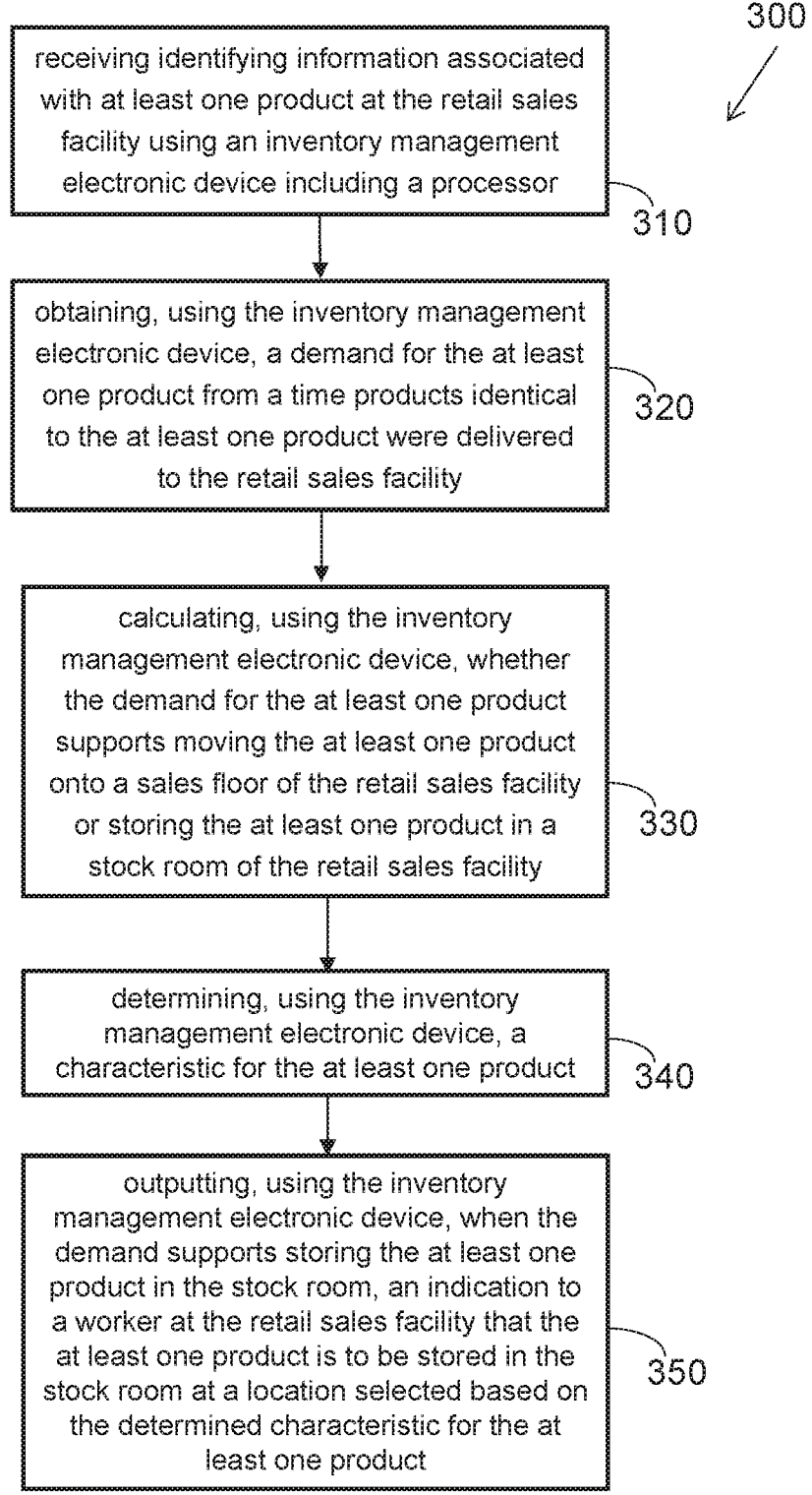
FIG. 3 is a flow chart diagram of a process of sorting overstock in accordance with some embodiments.

With reference to FIGS. 1-3, one method 300 of operation of the system 100 to manage and sort products 90 at a retail sales facility 110 will now be described. For exemplary purposes, the method is described in the context of the system of FIG. 1, but it is understood that embodiments of the method may be implemented in this or other systems. Generally, as shown in FIG. 3, the method 300 includes receiving identifying information associated with a product 90 at the retail sales facility 110 using the inventory management electronic device 120 (step 310). As depicted in step 320, the method 300 further includes obtaining a demand for the product 90 from a time products identical to the product 90 were delivered to the retail sales facility 110.

When identifying information regarding a product 90 located in the delivery/unloading area 160 (or stock room 170 or any other location at the retail sales facility 110) is entered using the inventory management electronic device 120, the processor of the control circuit 210 of the inventory management electronic device 120 may be programmed to send an appropriate query or signal to the inventory management database 140 internal to the inventory management electronic device 120, or to an inventory management database stored on a device remote to the retail sales location via the input/output 240. In one embodiment, the inventory management database 140, upon receiving such a query or signal including data identifying the product 90 can retrieve information related to past consumer demand for the product 90. It will be appreciated that instead of retrieving information related to past consumer demand for the product 90 at the retail sales facility 110, the information related to past consumer demand for the product 90 may be retrieved by the inventory management electronic device 120 from a database remote to the retail sales facility 110.

In one embodiment, the inventory management database 140 of the inventory management electronic device 120 may include data related to actual past consumer demand for the product or item 90, such as the total units sold of the item 90 at the retail sales facility 110 on any given day or per hour, for example. In one embodiment, the inventory management database 140 is configured to keep a running demand for the items 90 at the retail sales facility 110 since delivery of the items 90 to the retail sales facility 110 or a time when a decision is made that the items 90 represent "overstock" until a time when information regarding the items 90 is entered into the inventory management database 140. For example, when a stocking associate enters information regarding an item 90 using the inventory management electronic device 120, upon identification of the item 90, the processor of the control circuit 210 of the inventory management electronic device 120 may be programmed to determine space availability for that item 90 on a shelf on the sales floor 180 at the retail sales facility 110 by analyzing and/or calculating the past demand for the product 90 at the retail sales facility 110 within a predetermined time interval.

In other words, in some embodiments, the processor of the control circuit 210 of the inventory management electronic device 120 is programed to determine whether space is presently available for the product 90 on the shelf on the sales floor 180 by calculating whether the consumer demand for the product 90 supports moving the product 90 on to the sales floor 180 of the retail sales facility 110 or storing the product 90 in a stock room 170 at the retail sales facility 110 (step 330). In one approach, this determination (e.g., by the processor of the control circuit 210 of the inventory management electronic device 120) may be achieved by calculating the number of products 90 last delivered to the retail sales facility 110 and subtracting the consumer demand for the products 90 (e.g., the number of products 90 purchased by consumers) from the time when the products 90 were last delivered to the retail sales facility 110 (e.g., on a preceding day or the present day).

If it is determined by the processor of the control circuit 210 of the inventory management electronic device 120 that the consumer demand is greater than the number of products 90 last delivered to the retail sales facility 110 (i.e., number delivered−consumer demand<0), then the processor of the control circuit 210 of the inventory management electronic device 120 is programmed to cause the inventory management electronic device 120 to indicate to the stocking associate that space for the product 90 is available on the sales floor 180 and that the product 90 is to be stocked on a shelf (or other appropriate location) on the sales floor 180 to replenish the products 90 available for purchase by the consumers.

In one embodiment, in response to a determination by the processor of the control circuit 210 of the inventory management electronic device 120 that space for the scanned item 90 is presently available on a shelf on the sales floor 180 of the retail sales facility 110, the processor of the control circuit 210 is programmed to send a signal to the display 260 and/or speaker 280 of the inventory management electronic device 120 to generate a visible alert (e.g., via the on-screen menu) and/or an audible alert (e.g., beep or voice command) to inform the user (e.g., stocking associate) that space is available on the shelf on the sales floor 180. Such an audible or visual alert to the stocking associate regarding available space on the sales floor 180 would indicate to the associate that the item 90 is to be stocked on the sales floor 180 of the retail sales facility 110 instead of being stored in the stock room 170 at the retail sales facility 110.

In one embodiment, the processor of the control circuit 210 of the inventory management electronic device 120 is programmed to generate a "pick" for the product 90 stored in the stock room 170 in response to a determination by the processor of the control circuit 210 of the inventory management electronic device 120 that the demand for the product 90 supports moving the product 90 from the stock room 170 to the sales floor 180 of the retail sales facility 110. The pick may be automatically generated without requiring the worker at the retail sales facility 110 to manually scan the product 90 using the inventory management electronic device 120.

In one embodiment, when the inventory management electronic device 120 indicates (e.g., via a visual or audible alert) to the stocking associate that the item 90 may be stocked on a shelf on the sales floor 180 instead of the stock room 170, the inventory management electronic device 120 is configured to present the associate with an option to acknowledge the alert, for example, by pressing on the display screen 260 or on one of the inputs 270 of the inventory management electronic device 120. When the stocking associate acknowledges the alert, the processor of the control circuit 210 is programmed to designate the product 90 as being located on the shelf of the sales floor 180. In such a case, the processor of the control circuit 210 is programmed to send a signal to the inventory management database 140 or, via the input/output 240, to an inventory management database on a remote server, to indicate the item 90 as being stocked on the shelf on the sales floor 180 of the retail sales facility 110, thereby updating the location of the item 90 in the inventory management database 140 or in an inventory management database located remotely to the retail sales facility 110.

Thus, the inventory management database 140 and/or a remote database may store and update information regarding, for example, the total inventory of units of the item 90 at the retail sales facility 110, total number of units of the item 90 in the stock room 170, and/or the shelf on the sales floor 180, and/or any other location at the retail sales facility 110. As such, the initial entry of identifying information associated with the item 90 using the inventory management electronic device 120 and the associated update of the inventory management database 140 and/or a remote inventory management database effectively provides an audit of the items 90 in stock at the retail sales facility 110.

In one approach, if in response to receiving identifying information associated with a product 90 using the inventory management electronic device 120, the processor of the control circuit 210 of the inventory management electronic device 120 determines (or receives a signal) that no shelf space on the sales floor 180 of the retail sales facility 110 is presently available for the item 90, the processor of the control circuit 210 of the inventory management electronic device 120 is programmed to determine (or to otherwise obtain) a characteristic of the product 90 (step 340). The characteristic of the product 90 may be, for example, a description of the product 90 that permits association of the product 90 with other, related items. For example, the characteristic of the product 90 may be an item category (e.g., sports, home, office, toys, shoes, clothing, etc.) associated with the product 90, or a department of the retail sales facility 110 (e.g., baseball, bath products, printers, video games, sneakers, t-shirts, etc.) associated with the product 90. The characteristic of the item 90 may likewise be a designation of the item 90 as an each item (i.e., stand-alone item not sold in packs) or a case item (i.e., item sold in a case with multiple other identical items).

For example, in some embodiments, upon a determination (by the processor of the control circuit 210 of the inventory management electronic device 120 or based on information received from a remote database/server) that no space for the item 90 is presently available on the shelf on the sales floor 180 of the retail sales facility 110, the processor of the control circuit 210 is programmed to send a signal to the inventory management database 140 or, via the input/output 240, to a remote inventory management database, and in response, receive information indicating the characteristic (e.g., category or department, or any other suitable characteristic) associated with the product 90. In one embodiment, upon receiving information regarding the characteristic (i.e., identification of the item category or department where the item is to be stocked) of the item 90 from the inventory management database 140 (or a remote database), the display 260 of the inventory management electronic device 120 may visually indicate a location in the stock room 170 (e.g., a number of the storage bin or the letter and/or number of a shelf or other stock room area) where one or more products having an assigned characteristic identical to the characteristic of the item 90 are stored.

Such an indication by the inventory management electronic device 120 permits a stocking associate at the retail sales facility 110 to group items 90 having an identical characteristic (e.g., baseball bats, tennis rackets, swimming goggles, etc.) together in one area of the stock room 170 instead of storing items 90 having identical characteristics in different areas of the stock room 170. The logical grouping of items 90 having identical characteristics in one location of the stock room 170 advantageously improves the efficiency of subsequent retrieval of the items 90 from the stock room 170, since an inventory management associate does not have to go to multiple areas of the stock room 170 to retrieve similar items 90, but is provided with an opportunity to retrieve similar items 90 from one area of the stock room 170.

Figure 4:
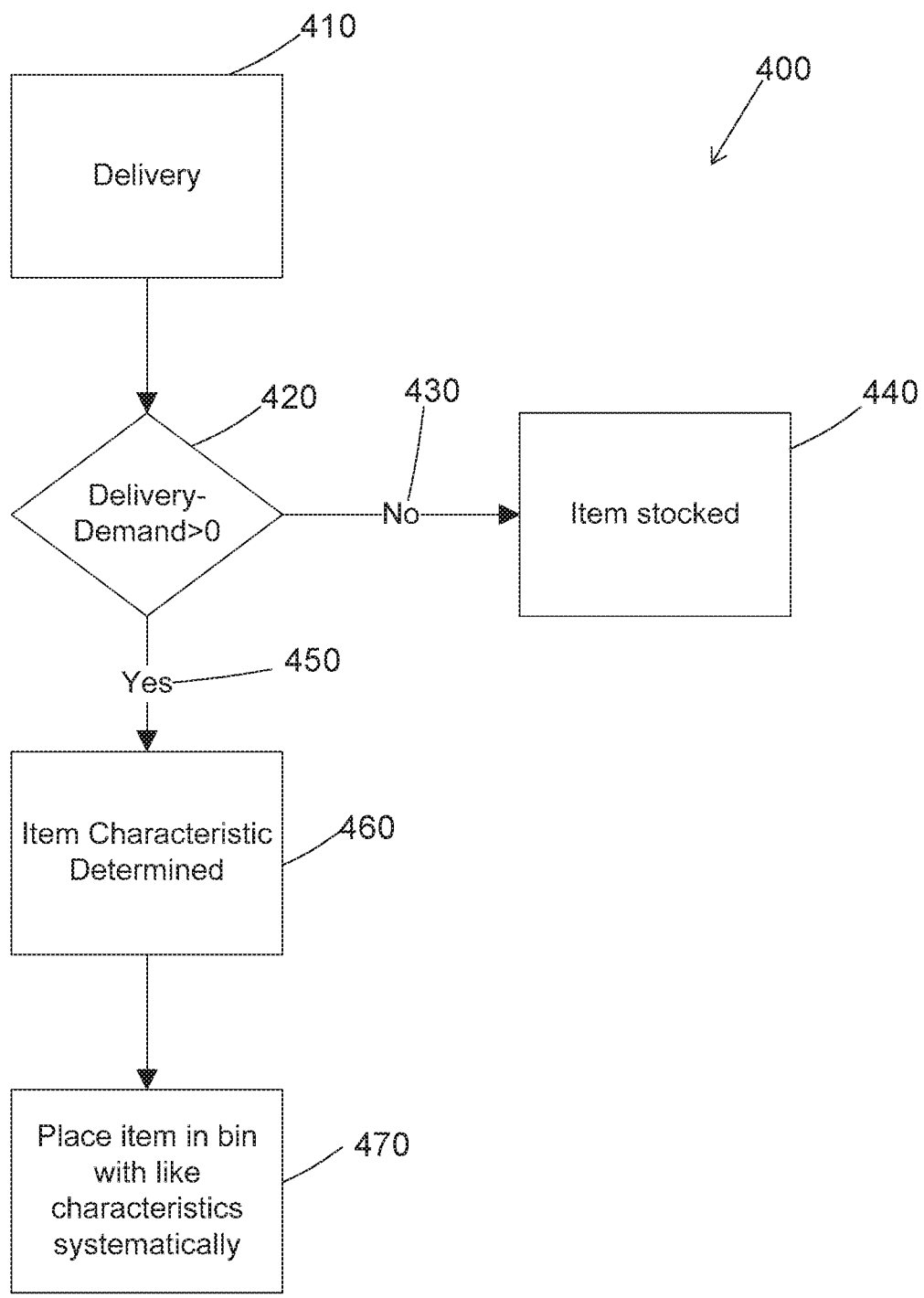
FIG. 4 is a flow chart diagram of a method of sorting products at a retail sales facility in accordance with several embodiments.

An exemplary method 400 of managing and stocking of products 90 at the retail sales facility 110 will now be described with reference to FIGS. 1 and 4. As shown generally in step 410, a stocking associate may audit, using the inventory management electronic device 120, a location (e.g., unloading area 160) at the retail sales facility 110 that may include newly-delivered items 90 to be sorted (e.g., either onto shelves on the sales floor 180 or bins in the stock room 170). During such an audit (which may include the stocking associate entering an SKU or another unique identifying of the item 90 into the inventory management electronic device 120), the inventory management electronic device 120 can be configured to retrieve or obtain (from the inventory management database 140 or a remote database) the total number of such items 90 delivered to the retail sales facility 110 at last delivery, and the actual consumer demand for these items 90 (i.e., total number of items 90 purchased) since last delivery to the retail sales facility 110. In the embodiment shown in FIG. 4, the processor of the control circuit 210 of the inventory management electronic device 120 is programmed to then calculate whether the total number of items 90 delivered to the retail sales facility 110 at last delivery is greater than or less than the total number of items 90 purchased by consumers since last delivery, as shown in step 420.

If it is determined by the processor of the control circuit 210 of the inventory management electronic device 120 that the total number of items 90 delivered to the retail sales facility 110 at last delivery is less than the total number of items 90 purchased by consumers since last delivery (step 430), then the processor of the control circuit 210 of the inventory management electronic device 120 is programmed to cause the inventory management electronic device 120 to indicate (e.g., via the display 260 or speaker 280) to the stocking associate that the item 90 is to be stocked on a shelf on the sales floor 180 of the retail sales facility 110 (step 440). Conversely, if it is determined by the processor of the control circuit 210 of the inventory management electronic device 120 that the total number of items 90 delivered to the retail sales facility 110 at last delivery is greater than the total number of items 90 purchased by consumers since last delivery (step 450), then the processor of the control circuit 210 of the inventory management electronic device 120 is programmed to cause the inventory management electronic device 120 to indicate (e.g., via the display 260 or speaker 280) to the stocking associate that the item 90 is to be stored in the stock room 170 of the retail sales facility 110 (step 460).

Upon a determination by the inventory management electronic device 120 that the item 90 is to be stored in the stock room 170 of the retail sales facility 110, a characteristic for the item 90 may then be determined in step 460. In some embodiments, the processor of the control circuit 210 of the inventory management electronic device 120 is programmed to retrieve the characteristic associated with the item 90 from the inventory management database 140 (or from a remote inventory management database), or to generate a suitable characteristic for the item 90 and assign the generated characteristic to the item 90. After the characteristic for the item 90 is determined and associated with the item 90 in the inventory management database 140, the inventory management electronic device 120 may then indicate (e.g., via the display 260 or speaker 280) characteristic information associated with the item 90 to the associate and indicate to the associate which location (e.g., bin, shelf, or another area) of the stock room 170 contains items having that characteristic.

This indication by the inventory management electronic device 120 requires the stocking associate to place the item 90 in the indicated location of the stock room 170 containing items having an identical characteristic to the item 90. The processor of the control circuit 210 may be programmed to then send a signal to the inventory management database 140 or an inventory management database stored on a server remote to the retail sales facility 110 to update the inventory management database 140 (or the remote inventory management database) to systematically indicate placement of the item 90 in a specified location of the stock room 170. As described above, the characteristic of the item 90 may be, for example, an item category associated with the item 90, a department of the retail sales facility 110 associated with the product 90, an each-level or case-level designation associated with the item 90, or any other characteristic of the item 90 suitable for identifying the item 90 and relating the item 90 to other items stored in the stock room 170 of the retail sales facility 110.

As described herein, the system and methods described herein provide for easy and efficient management of inventory at a retail sales facility by reducing the number of scans and data entries a stocking associate is required to perform when sorting overstock items at retail sales locations. As discussed above, in a response to receiving and identifying an item delivered to the retail sales location, the systems and methods described herein can determine whether the item is to be stocked on the shelf on the sales floor or stored in the stock room, and based upon a characteristic assigned to the item to be stored in the stock room, the systems and methods described herein provide for storage of the item in areas of the stock room where items having an identical item characteristics are stored. This improves stocking efficiency by restricting and/or avoiding situations where items delivered to a retail sales facility are stored in the stock room without regard for grouping of similar items in one area, thus enabling the stocking associates to efficiently organize the items in the stock room such that items having identical characteristics are stored together in the stock room. As such, the inventory management associates can retrieve items having identical characteristics from one bin or area of the stock room instead of having to retrieve such items from multiple storage bins at random locations in the stock room.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of sorting products at a retail sales facility, the method comprising:
   receiving identifying information associated with at least one product at the retail sales facility using an inventory management electronic device including a processor;
   obtaining, using the inventory management electronic device, a demand for the at least one product from a time products identical to the at least one product were delivered to the retail sales facility;
   calculating, using the inventory management electronic device, whether the demand for the at least one product supports moving the at least one product onto a sales floor of the retail sales facility or storing the at least one product in a stock room of the retail sales facility;
   determining, using the inventory management electronic device, a characteristic for the at least one product; and
   outputting, using the inventory management electronic device, when the demand supports storing the at least one product in the stock room, an indication to a worker at the retail sales facility that the at least one product is to be stored in the stock room at a location selected based on the determined characteristic for the at least one product.

2. The method of claim 1, wherein the receiving step further includes identifying the at least one product via a fixed position scanner without requiring the worker at the retail sales facility to scan the at least one product or manually input information regarding the at least one product.

3. The method of claim 1, wherein the obtaining step further comprises determining a number of the products identical to the at least one product sold at the retail sales facility from the time the products identical to the at least one product were delivered to the retail sales facility.

4. The method of claim 1, further comprising determining that the demand for the at least one product supports moving the at least one product on to the sales floor of the retail sales facility in response to a calculation that the number of the products identical to the at least one product delivered to the retail sales facility is less than the number of the products identical to the at least one product sold from the time the products identical to the at least one product were delivered to the retail sales facility.

5. The method of claim 1, further comprising determining that the demand for the at least one product supports storing the at least one product in the stock room in response to a calculation that the number of the products identical to the at least one product delivered to the retail sales facility is greater than the number of the products identical to the at least one product sold from the time the products identical to the at least one product were delivered to the retail sales facility.

6. The method of claim 1, wherein the determining the characteristic step further comprises determining an item category for the at least one product.

7. The method of claim 6, wherein the outputting step further comprises determining at least one storage bin in the stock room containing items having an identical item category to the at least one product, and indicating to the worker that the at least one product is to be binned in the storage bin containing the items having the identical item category to the at least one product.

8. The method of claim 1, wherein the determining the characteristic step further comprises associating the at least one product with a product department at the retail sales location.

9. The method of claim 8, wherein the outputting step further comprises determining an area in the stock room containing items associated with the product department associated with the at least one product, and indicating to the worker that the at least one product is to be stored in the area in the stock room containing the items associated with the product department associated with the at least one product.

10. The method of claim 1, further comprising automatically generating a pick for the at least one product stored in the selected location of the stock room in response to a determination that the demand for the at least one product supports moving the at least one product from the stock room on to the sales floor of the retail sales facility.

11. A system for sorting products at a retail sales facility, the system comprising:
 a database including identifying information associated with at least one product at the retail sales facility; and
 an electronic device including a control circuit having a processor in communication with the database and configured to:
  receive the identifying information associated with at least one product at the retail sales facility;
  obtain a demand for the at least one product from a time products identical to the at least one product were delivered to the retail sales facility;
  calculate whether the demand for the at least one product supports moving the at least one product onto a sales floor of the retail sales facility or storing the at least one product in a stock room of the retail sales facility;
  determine a characteristic for the at least one product; and
  output, when the demand supports storing the at least one product in the stock room, an indication to a worker at the retail sales facility that the at least one product is to be stored in the stock room at a location selected based on the determined characteristic for the at least one product.

12. The system of claim 11, wherein the electronic device is a fixed position scanner configured to receive data identifying the at least one product at the retail sales facility without requiring the worker at the retail sales facility to scan the at least one product or manually input information regarding the at least one product.

13. The system of claim 11, wherein the electronic device is configured to determine a number of the products identical to the at least one product sold at the retail sales facility from the time the products identical to the at least one product were delivered to the retail sales facility.

14. The system of claim 11, wherein the electronic device is configured to determine that the demand for the at least one product supports moving the at least one product on to the sales floor of the retail sales facility in response to a calculation that the number of the products identical to the at least one product delivered to the retail sales facility is less than the number of the products identical to the at least one product sold from the time the products identical to the at least one product were delivered to the retail sales facility.

15. The system of claim 11, wherein the electronic device is configured to determine that the demand for the at least one product supports storing the at least one product in the stock room in response to a calculation that the number of the products identical to the at least one product delivered to the retail sales facility is greater than the number of the products identical to the at least one product sold from the time the products identical to the at least one product were delivered to the retail sales facility.

16. The system of claim 11, wherein the electronic device is configured to determine an item category for the at least one product.

17. The system of claim 16, wherein the electronic device is configured to determine at least one storage bin in the stock room containing items having an identical item category to the at least one product, and indicate to the worker that the at least one product is to be binned in the storage bin containing the items having the identical item category to the at least one product.

18. The system of claim 11, wherein the electronic device is configured to associate the at least one product with a product department at the retail sales location.

19. The system of claim 18, wherein the electronic device is configured to determine an area in the stock room containing items associated with the product department associated with the at least one product, and indicate to the worker that the at least one product is to be stored in the designated area in the stock room containing the items associated with the product department associated with the at least one product.

20. The system of claim 11, wherein the electronic device is configured to automatically generate a pick for the at least one product stored in the selected location of the stock room in response to a determination that the demand for the at least one product supports moving the at least one product from the stock room on to the sales floor of the retail sales facility.

21. A system for sorting products at a retail sales facility, the system comprising:
 a storage means including identifying information associated with at least one product at the retail sales facility; and
 a control means in communication with the database and configured to:
  receive the identifying information associated with at least one product at the retail sales facility;
  obtain a demand for the at least one product from a time products identical to the at least one product were delivered to the retail sales facility;

calculate whether the demand for the at least one product supports moving the at least one product onto a sales floor of the retail sales facility or storing the at least one product in a stock room of the retail sales facility;

determine a characteristic for the at least one product; and output, when the demand supports storing the at least one product in the stock room, an indication to a worker at the retail sales facility that the at least one product is to be stored in the stock room at a location selected based on the determined characteristic for the at least one product.

* * * * *